US011737183B2

United States Patent
Casey et al.

(10) Patent No.: US 11,737,183 B2
(45) Date of Patent: Aug. 22, 2023

(54) SYSTEM HAVING INDEPENDENT CONTROL OF CIRCADIAN RESPONSE AND COLOR TEMPERATURE

(71) Applicant: Lutron Technology Company LLC, Coopersburg, PA (US)

(72) Inventors: Craig A. Casey, Coopersburg, PA (US); Brent Protzman, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/311,650

(22) PCT Filed: Dec. 6, 2019

(86) PCT No.: PCT/US2019/065106
§ 371 (c)(1),
(2) Date: Jun. 7, 2021

(87) PCT Pub. No.: WO2020/118280
PCT Pub. Date: Jun. 11, 2020

(65) Prior Publication Data
US 2022/0110195 A1  Apr. 7, 2022

Related U.S. Application Data

(60) Provisional application No. 62/776,838, filed on Dec. 7, 2018.

(51) Int. Cl.
*H05B 45/20* (2020.01)
*H05B 45/10* (2020.01)

(52) U.S. Cl.
CPC .................................. *H05B 45/20* (2020.01)

(58) Field of Classification Search
None
See application file for complete search history.

(56) References Cited

U.S. PATENT DOCUMENTS

| 9,410,664 | B2 | 8/2016 | Krames et al. |
| 9,788,387 | B2 | 10/2017 | Soler et al. |
| 9,844,116 | B2 | 12/2017 | Soler et al. |
| 2013/0002144 | A1 | 1/2013 | Adler |
| 2014/0228914 | A1* | 8/2014 | van de Ven .......... A61N 5/0618 607/88 |

(Continued)

OTHER PUBLICATIONS

Macadam D L: "Visual Sensitivities to Color Differences in Daylight", Journal of the Optical Society of America, Optical Society of America, US, vol. 32, No. 5, May 1, 1942, pp. 247-274, ISSN: 0030-3941, abstract.

*Primary Examiner* — Dedei K Hammond
(74) *Attorney, Agent, or Firm* — Glen Farbanish; Philip Smith; Michael Czarnecki

(57) ABSTRACT

Methods and systems as described herein may be used for independently controlling the color temperature, intensity, and/or circadian response (CR) of one or more light sources (e.g., discrete-spectrum light sources) to adjust one or more color temperature, intensity, and circadian metrics in a space. For example, a light fixture may have four controllable light sources, a warm CR boost, cool CR boost, warm non-boost CR and a cool non-boost CR to independently control intensity, color temperature, and CR outputs.

18 Claims, 7 Drawing Sheets

(56) References Cited

U.S. PATENT DOCUMENTS

2015/0327342 A1* 11/2015 Lu .................. H05B 45/00
                                                315/294
2018/0172227 A1   6/2018 Soler et al.
2018/0338359 A1  11/2018 Soler

* cited by examiner

SYSTEM HAVING INDEPENDENT CONTROL OF CIRCADIAN RESPONSE AND COLOR TEMPERATURE

CROSS-REFERENCE TO RELATED APPLICATION

This application is a national stage application, filed under 35 U.S.C. § 371, of International Patent Application PCT/US2019/065106, filed on Dec. 9, 2019, which claims the benefit of U.S. Provisional Patent Application No. 62/776,838, filed Dec. 7, 2018, the entire disclosures of which are incorporated by reference herein.

BACKGROUND

Traditional sources of light such as the sun as well as incandescent and halogen lamps may exhibit the characteristics of a black body radiator. Such light sources typically can emit a relatively continuous-spectrum of light across the range of visible wavelengths, and the continuous emissions range the entire bandwidth of the visible light spectrum (e.g., light with wavelengths between approximately 390 nm and 700 nm). The human eye is accustomed to operating in the presence of black body radiators and is able to distinguish a large variety of colors when emissions from a black body radiator are reflected off of an object of interest. The spectrum of emitted light may be associated with a given "color temperature" of a black body radiator.

Non-incandescent light sources such as fluorescent lights (e.g., compact fluorescent lights or CFLs) and light emitting diodes (LEDs) have become more widely available due to their relative power savings as compared to traditional incandescent lamps. Typically, light from CFLs or LEDs does not exhibit the properties of a black body radiator. Instead, the emitted light is often more discrete in nature due to the differing mechanisms by which CFLs and/or LEDs generate light as compared to an incandescent or halogen light bulbs. Since CFLs and LEDs are not able to emit a relatively continuous-spectrum of light across the range of visible wavelengths (e.g., instead having peak intensities at one or more discrete points within the visible spectrum), CFLs and LEDs are often referred to as discrete-spectrum light sources. Phosphorescent materials are often used to spread the discrete-frequencies of light emission from a CFL or LED source across a broader range of frequencies. In one example of a phosphor-converted light source, blue or purple LEDs having a peak wavelength between 380-500 nanometers may be used with a phosphorescent material which absorbs a portion of the peak wavelength and re-emits light across a range of lower frequencies to create white light. However, light at the peak wavelength of the LED (i.e., between 380-500 nanometers) may not be fully absorbed by the phosphor and may still be emitted by the light source.

The circadian rhythm of the human body may be affected by the color temperature and the intensity of light entering the pupils. For example, current metrics, such as circadian stimulus (CS) and equivalent melanopic lux (EML), associate light in the frequency range of about 440 nanometers to about 490 nanometers, or blue light, with providing an increased melatonin suppressing stimulus (MSS). The amount of MSS a person is exposed to (via light entering their pupils) may affect a person's alertness and sleep patterns. For example, a greater MSS exposure may increase alertness and disrupt sleep.

Although current lighting control systems are configured to control both color temperature and intensity of light, particularly light emitted by LED light sources, one drawback is that such systems provide minimal control over the amount of MSS a user is exposed to, or require the color temperature and/or intensity to be drastically changed to control MSS. Further, allowing a user to manually adjust the intensity and/or color temperature of the light in a space may adversely affect the amount of MSS that the user is exposed to. For example, a user may desire warm light (i.e., with a low blue frequency content), at a medium brightness, depending on the task. However, reducing the intensity and using a warm color temperature may yield an MSS value that is below a desired minimum MSS exposure. Therefore, there is a need for a lighting control system capable of controlling or adjusting the MSS value of the light in a room or building independently of color temperature and intensity.

SUMMARY

As described herein, a load control system may include a plurality of lighting fixtures each having a cumulative light output that may be controlled to adjust intensity, color (e.g., color temperature), and circadian response (CR) of the cumulative light emitted by the lighting fixtures. The CR may be a metric correlated with an approximate MSS value for the emitted light. While the intensity and color temperature of the light may also affect the MSS value, the CR value may be the dominant factor in impacting the MSS in a space. This MSS value is a generic way of referencing industry metrics for melatonin suppression such as Circadian Stimulus (CS), Equivalent Melanopic Lux (EML), or other future industry metrics.

The lighting fixtures may comprise at least a first light source and a second light source. The first and second light sources may have substantially the same correlated color temperature (CCT) output with different CR levels (i.e., may create different MSS in the space). For example, the first and second light sources may have chromaticities within a one-step MacAdam ellipse of each other within the u'v' color space. The first light source may have a higher CR than the second light source by emitting light having a higher spectral power distribution in a blue wavelength range. For example, according to industry metrics such as CS and EML, the blue wavelength range may correspond to approximately 440-490 nanometers for peak sensitivity of melatonin suppression, or more broadly, the action spectra may correspond to approximately 425 to 525 nanometers, as will be referred to herein.

According to a first embodiment, the first and second light sources may each comprise a phosphor-converted LED. The LED of the first light source may have a peak emission in the wavelength range of 425 to 525 nanometers, and the LED of the second light source may have a peak emission at less than 425 nanometers.

According to a second embodiment, the lighting fixture may further include a third and fourth light source with substantially the same CCT with different CR levels. The example, the third and fourth light sources may have chromaticities within a one-step MacAdam ellipse of each other within the u'v' color space. For example, the first and second light sources may have a warm CCT in the range of 1800-3000 Kelvin and the third and fourth light sources may have a cool CCT in the range of 3500-8000 Kelvin, or vice versa. The third and fourth light sources may each comprise a phosphor-converted LED. The LED of the third light source may have a peak emission in the wavelength range of 425 to 525 nanometers, and the LED of the fourth light source may have a peak emission at less than 425 nanometers. The lighting fixture may receive commands from a system controller or a control source device and may independently control the intensity, CCT, and CR of the cumulative light output by adjusting respective intensities of the first, second, third and fourth light sources. For example, the lighting fixture may increase or decrease the CR of the cumulative light output while maintaining the same intensity and CCT of the cumulative light output to increase or decrease MSS in the space without changing the apparent visible light output.

DETAILED DESCRIPTION

A lighting device may be controlled to achieve many factors. The factors may include melatonin suppressing stimulus (MSS) (i.e., Equivalent Melanopic Lux, Circadian Stimulus (CS), etc.), vividness, naturalness, color rending index (CRI), correlated color temperature (CCT), red saturation, blue saturation, green saturation, color preference, color discrimination, illuminance/intensity, efficacy, and/or correction for color deficiencies (e.g., red-green color blindness). A lighting device may achieve the above factors through the use of a metric correlated with any of the above factors. For example, circadian response (CR) may be a metric correlated with an approximate MSS value for the emitted light, that is, a value used by a fixture or lighting device to assess how the light output by the fixture or lighting device may achieve a desired MSS value.

Figure 1:
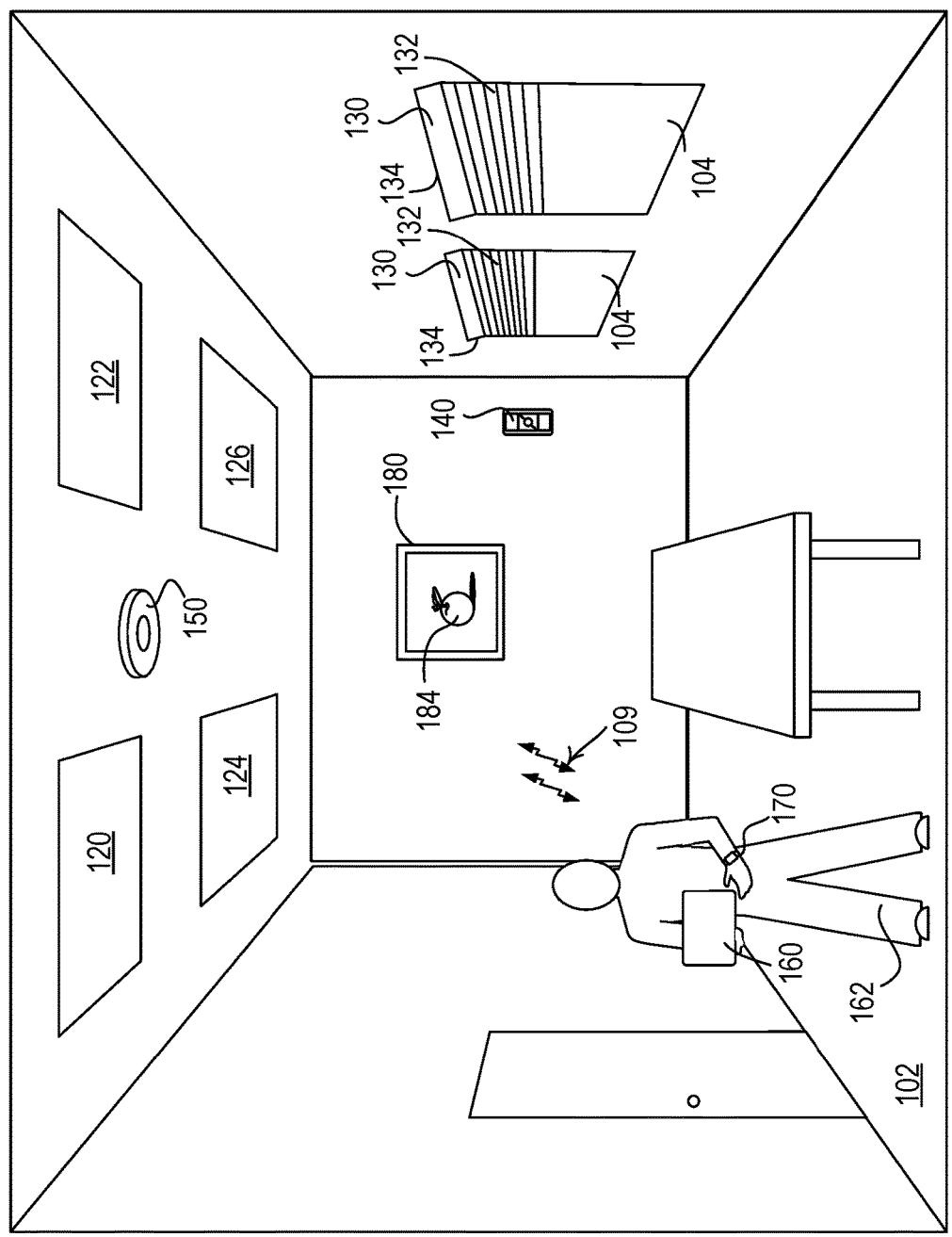
FIG. 1 depicts an example load control system for controlling color of one or more lighting fixtures.

FIG. 1 is a diagram of an example load control system 100 for controlling color, intensity, and CR (and thereby MSS in the space) of one or more lighting loads installed in lighting fixtures 120-126. The load control system 100 may be installed in one or more rooms 102 of a building. The load control system 100 may comprise a plurality of control devices configured to communicate with each other via wireless signals, e.g., radio-frequency (RF) signals 108. Alternatively, or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device.

The control-source devices may be configured to transmit digital messages directly to the control-target devices. Additionally, or alternatively, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The system controller may also directly control control-target devices without receiving messages from control-source devices, such as in response to time-clock schedules. The control-source and control-target devices and the system controller 110 may be configured to transmit and receive the RF signals 108 using a proprietary RF protocol, such as the ClearConnect® protocol. Alternatively, the RF signals 108 may be transmitted using a different RF protocol, such as, a standard protocol, for example, one of WIFI, BLUETOOTH, ZIGBEE, THREAD, Z-WAVE, KNX-RF, ENOCEAN RADIO protocols, or a different proprietary protocol.

The control-target devices in the load control system 100 may comprise one or more remotely-located load control devices, such as light-emitting diode (LED) drivers (not shown) that may be installed in the lighting fixtures 120-126 for controlling the respective lighting loads (e.g., LED light sources and/or LED light engines). The LED drivers may be located in or adjacent to the lighting fixtures 120-126. The LED drivers may be configured to receive digital messages such as via the RF signals 108 (e.g., from the system controller 110) and to control the respective LED light sources in response to the received digital messages. The LED drivers may be configured to adjust intensities of the respective LED light sources in response to the received digital messages to adjust an intensity, a color (e.g., a color temperature), and/or a CR (e.g., a CR value) of the cumulative light emitted by the respective lighting fixtures 120-126. The LED drivers may attempt to control the color temperature of the cumulative light emitted by the lighting fixtures 120-126 along a black body radiator curve on the chromaticity coordinate system. Examples of LED drivers configured to control the color temperature of LED light sources are described in greater detail in U.S. Patent Application Publication No. 2014/0312777, filed Oct. 23, 2014, entitled SYSTEMS AND METHODS FOR CONTROLLING COLOR TEMPERATURE, the entire disclosure of which is hereby incorporated by reference. Examples of changing color temperature throughout the day to mimic the natural sunlight described in greater detail in U.S. Patent Application Publication No. 2018/0077770, published Mar. 15, 2018 by Nav Sooch, et al., entitled ILLUMINATION DEVICE, SYSTEM AND METHOD FOR MANUALLY ADJUSTING AUTOMATED PERIODIC CHANGES IN EMULATION OUTPUT, the entire disclosure of which is hereby incorporated by reference herein in its entirety.

Other example LED driver configured to control the color temperature of LED light sources may also be used in load control system 100. The load control system 100 may further comprise other types of remotely-located load control devices, such as, for example, electronic dimming ballasts for driving fluorescent lamps.

The load control system 100 may comprise one or more daylight control devices, e.g., motorized window treatments 130, such as motorized cellular shades, for controlling the amount of daylight entering the room 102. Each motorized window treatments 130 may comprise a window treatment fabric 132 hanging from a headrail 134 in front of a respective window 104. Each motorized window treatment 130 may further comprise a motor drive unit (not shown) located inside of the headrail 134 for raising and lowering the window treatment fabric 132 for controlling the amount of daylight entering the room 102. The motor drive units of the motorized window treatments 130 may be configured to receive digital messages via the RF signals 108 (e.g., from the system controller 110) and adjust the position of the respective window treatment fabric 132 in response to the received digital messages. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Patent Application Publication No. 2014/0305602, published Oct. 16, 2014, entitled INTEGRATED ACCESSIBLE BATTERY COMPARTMENT FOR MOTORIZED WINDOW TREATMENT, the entire disclosures of which are hereby incorporated by reference. Other example motorized window treatments may also be used in load control system 100.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as one or more remote control devices 140 and/or one or more sensors 150 (e.g., visible light sensors). The input devices may be fixed or movable input devices. The system controller 110 may be configured to transmit one or more digital messages to the load control devices (e.g., the LED drivers in the lighting fixtures 120-126, and/or the motorized window treatments 130) in response to the digital messages received from the remote control device 140 and the sensor 150. The remote control device 140 and/or the sensor 150 may be configured to transmit digital messages directly to the LED drivers of lighting fixtures 120-126, and/or the motorized window treatments 130.

The remote control device 140 may be configured to transmit digital messages via the RF signals 108 to the system controller 110 (e.g., directly to the system controller) in response to an actuation of one or more buttons of the remote control device. The digital messages may include commands for adjusting the intensity, color temperature, and/or circadian response (CR) value of the lighting fixtures 120-126. For example, the remote control device 140 may be battery-powered.

The sensor 150 may transmit digital messages that include information regarding occupancy and/or vacancy in the room 102, and/or the intensity and/or the color temperature of the illumination in the room 102 (e.g., as a value or an image). The sensor 150 may be installed externally or inside any of the lighting fixtures 120-126. The system controller 110 may control the intensity and/or the color temperature of the light emitted by the lighting fixtures 120-126 based on the occupancy conditions detected by the sensor 150 and/or the light intensity measured by the sensor 150. Again, the load control system 100 may include a single sensor or multiple sensors with each configured to detect any of occupancy and/or vacancy in the room 102, the intensity of the illumination in the room, and/or the color temperature of the illumination in the room.

For example, the sensor 150 may be configured to measure a light intensity in the room 102 (e.g., may operate as a daylight sensor). The sensor 150 may transmit digital messages including the measured light intensity via the RF signals 108 for controlling the lighting fixtures 120-126 in response to the measured light intensity. Examples of RF load control systems having daylight sensors are described in greater detail in U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference. Other example daylight sensors may also be used in load control system 100.

The sensor 150 may be configured to detect occupancy and/or vacancy conditions in the room 102 (e.g., may operate as an occupancy and/or vacancy sensor). The occupancy sensor 150 may transmit digital messages to load control devices via the RF communication signals in response to detecting the occupancy or vacancy conditions. The system controller 110 may be configured to turn the lighting fixtures 120-126 on and off in response to receiving an occupied command and a vacant command, respectively. The sensor 150 may operate as a vacancy sensor, such that the lighting fixtures 120-126 are only turned off in response to detecting a vacancy condition (e.g., and not turned on in response to detecting an occupancy condition). Examples of RF load control systems having occupancy and vacancy sensors are described in greater detail in U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference. Other example occupancy and/or vacancy sensors may also be used in load control system 100.

The sensor 150 may also be configured to measure a color (e.g., measure a color temperature) of the light emitted by one or more of the lighting fixtures 120-126 in the room 102 (e.g., to operate as a color sensor and/or a color temperature sensor). The sensor 150 may transmit digital messages (e.g., including the measured color temperature) to the system controller 110 via the RF signals 108 for controlling the color (e.g., the color temperatures) of the lighting fixtures 120-126 in response to the measured color temperature (e.g., color tuning of the light in the room). An example of a load control system for controlling the color temperatures of one or more lighting loads is described in greater detail in U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference. Other example color sensors may also be used in load control system 100.

The sensor 150 may comprise a camera or visible light sensor directed into the room 102. The sensor 150 may be configured to process images recorded by the camera and transmit one or more digital messages to the load control devices in response to the images (e.g., in response to one or more sensed environmental characteristics determined from the images). The sensor 150 may transmit digital messages to the system controller 110 via the RF signals 108 (e.g., using the proprietary protocol) in response to detecting a change in color temperature. The sensor 150 may comprise a first communication circuit for transmitting and receiving the RF signals 108 using the proprietary protocol. Examples of load control systems having visible light sensors are described in more detail in U.S. Pat. No. 10,264,651, issued Apr. 16, 2019, entitled LOAD CONROL SYSTEM HAVING A VISIBLE LIGHT SENSOR, the entire disclosure of which is hereby incorporated by reference.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 160, such as, a personal computing device and/or a wearable wireless device 170. The mobile device 160 and/or the wearable wireless device 170 may be located on an occupant 162, for example, may be attached to the occupant's body or clothing or may be held by the occupant. The mobile device 160 may be characterized by a unique identifier (e.g., a serial number or address stored in memory) that uniquely identifies the mobile device 160 and thus the occupant 162. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 160 (and/or the wearable wireless device 170) may be configured to transmit digital messages to the system controller 110, for example, in one or more Internet Protocol packets. For example, the mobile device 160 (and/or the wearable wireless device 170) may be configured to transmit digital messages to the system controller 110 over the LAN and/or via the internet. The mobile device 160 may be configured to transmit digital messages over the internet to an external service (e.g., If This Then That (IFTTT®) service), and then the digital messages may be received by the system controller 110. The mobile device 160 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof. Alternatively, or additionally, the mobile device 160 may be configured to transmit RF signals 108 according to the proprietary protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference. Mobile and/or network devices may also communicate with system 100 in other manners. Examples of load control systems responsive to gesture controls of wearable wireless devices (such as wearable wireless device 170) are described in greater detail in U.S. Pat. No. 10,484,827, granted Nov. 19, 2019, entitled GESTURE-BASED LOAD CONTROL VIA WEARABLE DEVICES, the entire disclosure of which is hereby incorporated by reference.

The operation of the load control system 100 may be programmed and configured using, for example, the mobile device 160 or other network device (e.g., when the mobile device is a personal computing device). The mobile device 160 may execute a graphical user interface (GUI) configuration software for allowing a user to program how the load control system 100 will operate. For example, the configuration software may run as a PC application or a web based application. The configuration software and/or the system controller 110 (e.g., via instructions from the configuration software) may generate a load control database that defines the operation of the load control system 100. The load control database may be stored at the system controller. For example, the load control database may include information regarding the different control-source and control-target devices making up of the load control system, and the operational settings of these different load control devices of the load control system (e.g., the LED drivers of the lighting fixtures 120-126, and/or the motorized window treatments 130). The load control database may comprise information regarding associations between control-target devices and control-source devices (e.g., the remote control device 140, the sensor 150, etc.). The load control database may comprise information regarding how the control-target devices respond to inputs received from the control-source devices. Examples of configuration procedures for load control systems are described in greater detail in U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. patent application Ser. No. 13/830,237, filed Mar. 14, 2013, entitled COMMISSIONING LOAD CONTROL SYSTEMS, the entire disclosure of which is hereby incorporated by reference.

Various fixture capability information may be determined for one or more of the lighting fixtures (e.g., the fixtures 120-126) within load control system 100. The fixture capability information may include one or more fixture capability metrics for one or more operating parameters of the lighting fixtures. For example, one operating parameter of a lighting fixture may be color temperature (e.g., measured in Kelvin), and fixture capability metrics of the color temperature may be a minimum color temperature, a maximum color temperature, a color temperature range, and/or a correlated color temperature (CCT) tuning curve. Another operating parameter of a lighting fixture may be color, and fixture capability metrics of the color may be a color gamut (e.g., represented by the chromaticity coordinates of the individual light sources in the lighting fixture) and/or a color mixing curve. Another fixture capability metric of the color of a lighting fixture may be a spectral power distribution (e.g., a full or partial spectrum) per internal LED light source, which may be represented by one or more peak wavelengths, a spectral width, and/or spectral power measurements at one or more wavelengths. Another operating parameter of a lighting fixture may be intensity, and fixture capability metrics of the intensity of the lighting fixture may be the maximum and minimum lumen outputs per internal LED light source, a dimming range, and/or a dimming curve. Another operating parameter of a lighting fixture may be power consumption, and fixture capability metrics of power consumption may be a power range and/or a power consumption of the lighting fixture when each of the internal LED light sources is turned on individually. Another operating parameter of a lighting fixture may be circadian response, and fixture capability metrics of circadian response may be a circadian response range based on the spectrum of the individual light sources in the lighting fixture.

Knowledge of the fixture capability information for the lighting fixtures 120-126 may enable the system controller 110 to control the fixtures to achieve a desired overall effect in the space (e.g., a desired color temperature). For example, a perceived color temperature may differ from a measured color temperature (e.g., measured by a light meter). The system controller may use the fixture capability information for each fixture in a given space (e.g., such as the room 102) to control the fixtures to achieve the desired color temperature. For example, the system controller 110 may know a maximum CCT value ($CCT_{max}$) and a minimum CCT value ($CCT_{min}$) for each fixture, as programmed into or measured by the system controller 110. Examples of lighting control systems configured to obtain fixture capability information are described in more detail in U.S. Patent Publication No. 20180160491, published on Jun. 7, 2018 by Biery et al., entitled SYSTEMS AND METHODS FOR CONTROLLING COLOR TEMPERATURE, the entire disclosure of which is hereby incorporated by reference herein in its entirety.

Figure 2A:
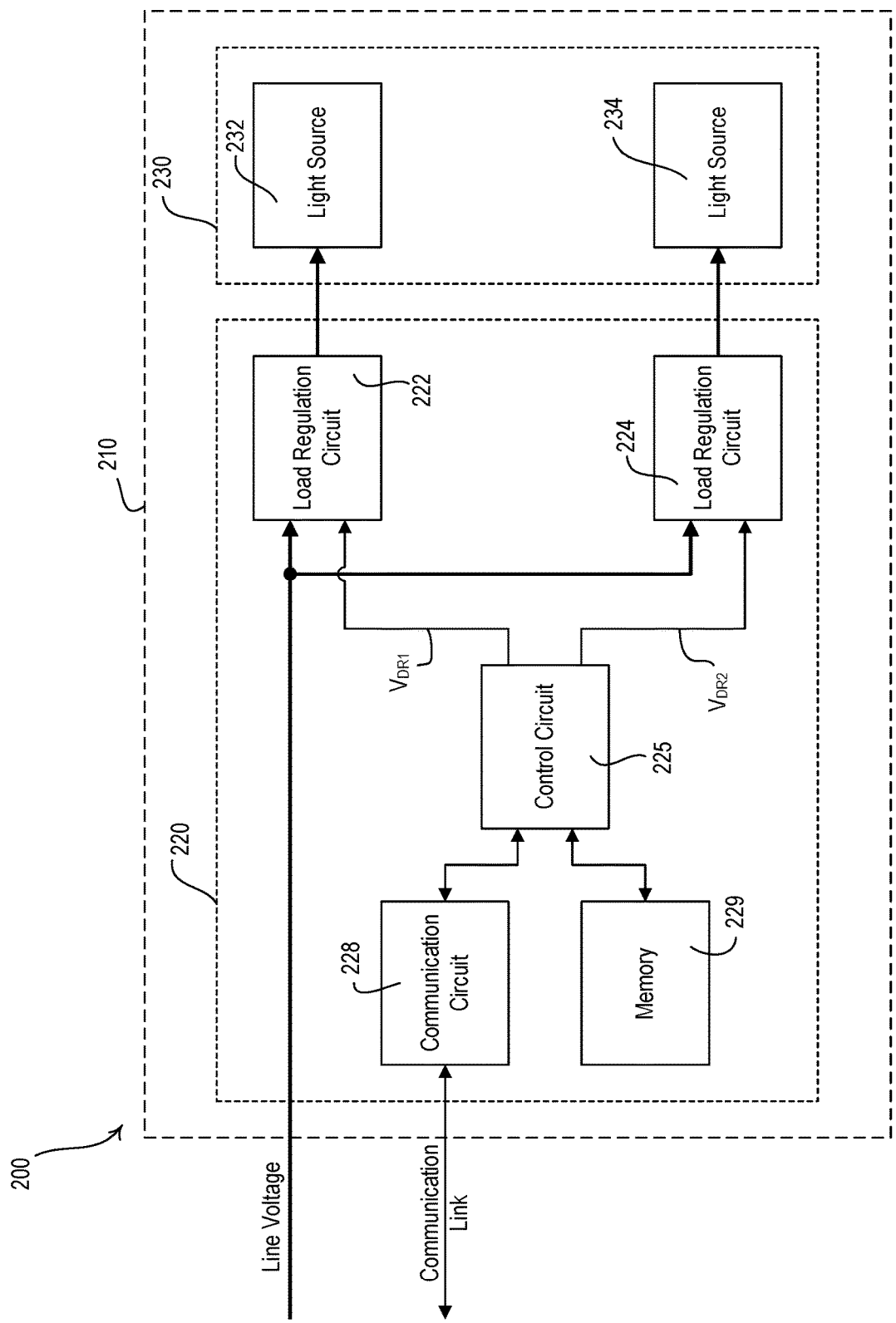
FIG. 2A-2B illustrate example diagrams of multi-channel or multi-driver lighting fixtures.
Figure 2B:
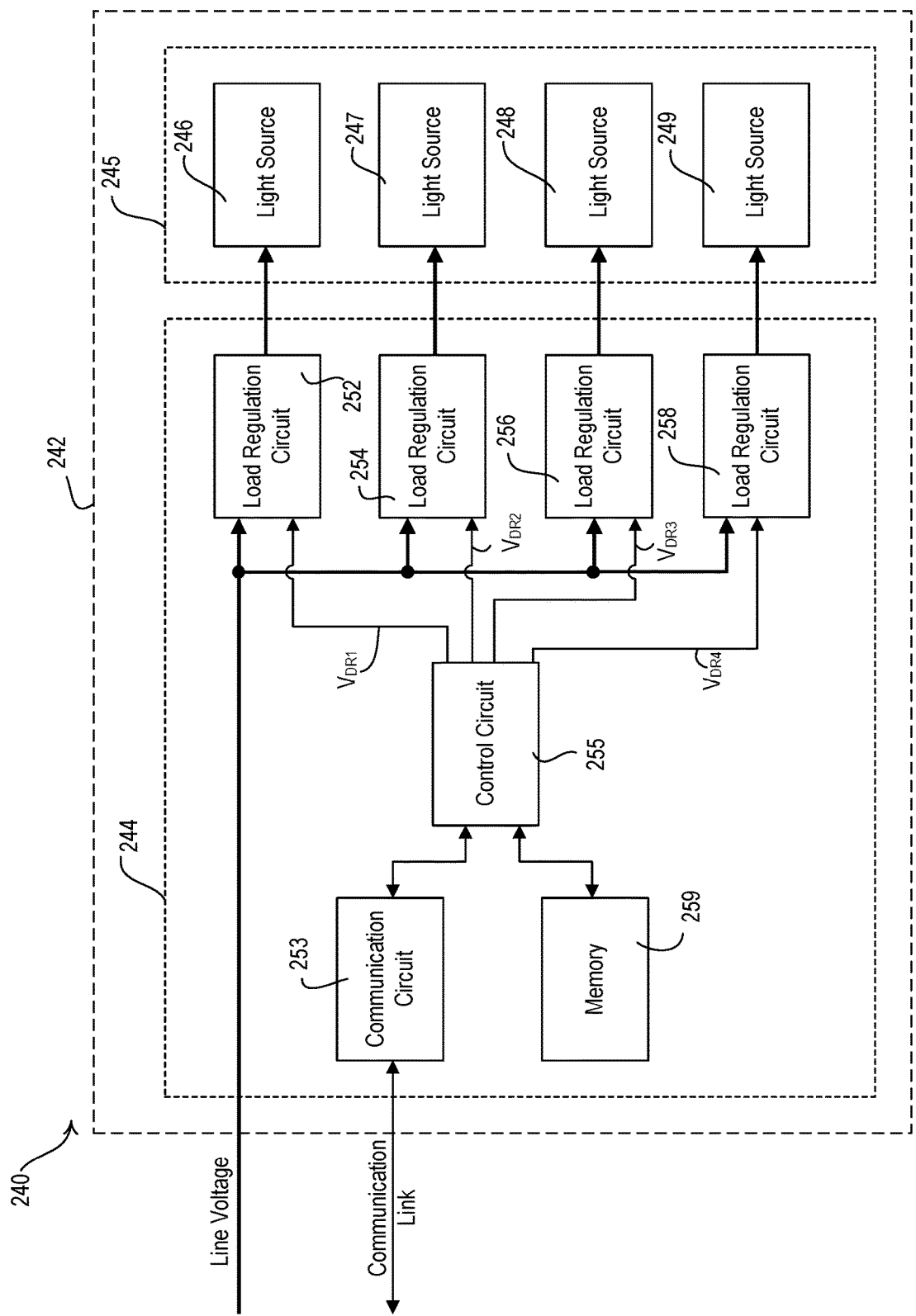
Figure 3A:
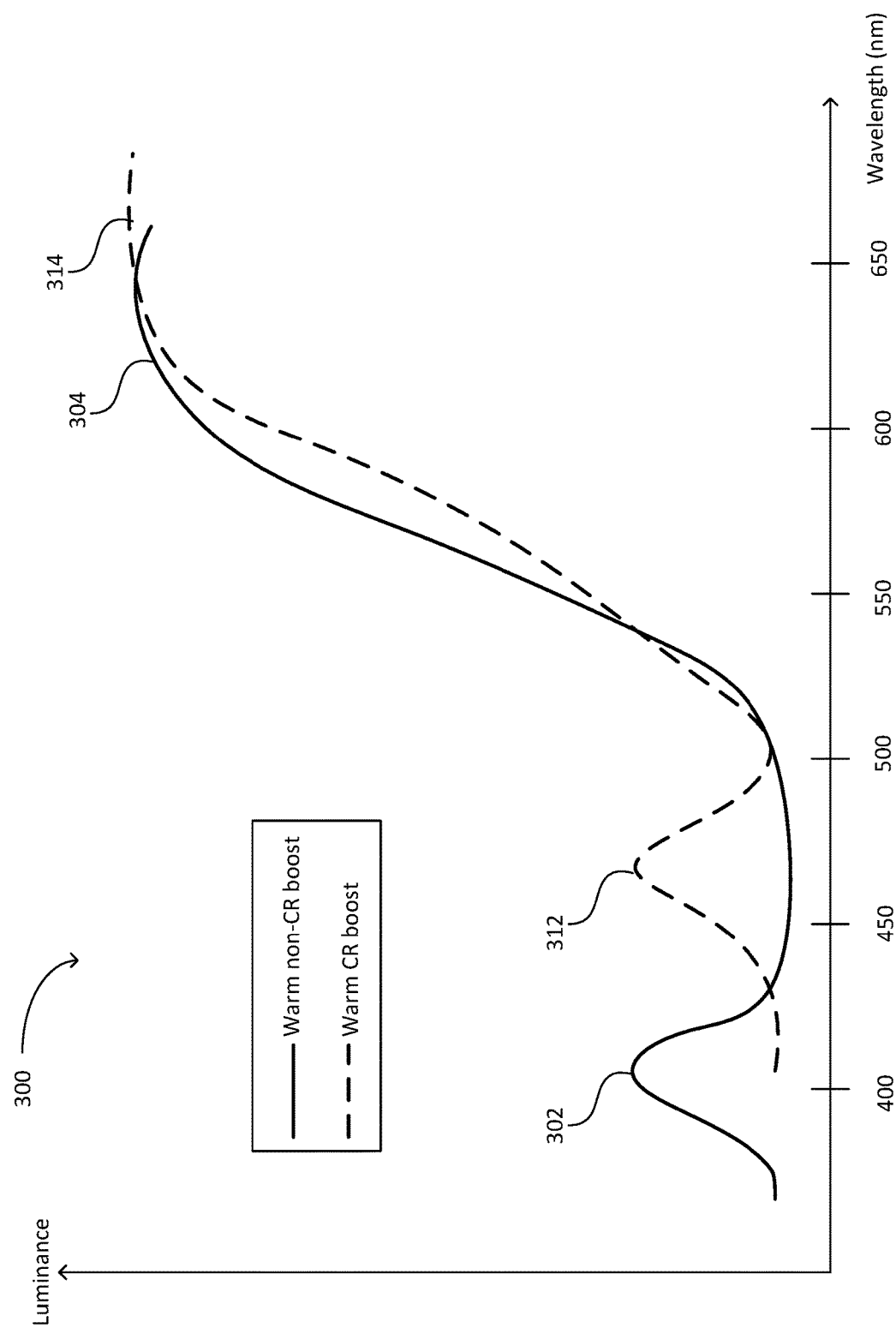
FIGS. 3A and 3B depict example spectral outputs of light sources with high and low CR.
Figure 3B:
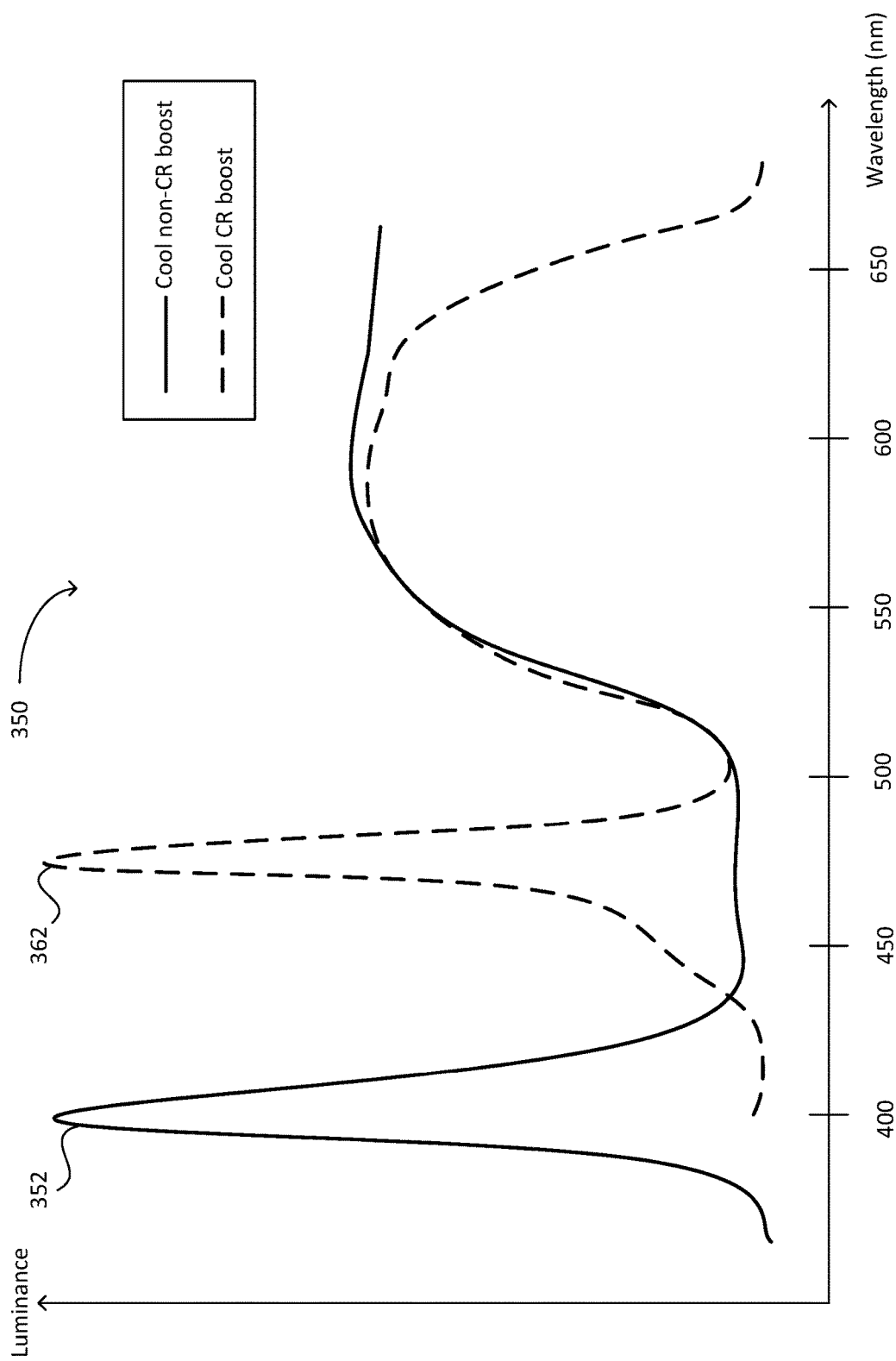

FIGS. 2A, 2B are block diagrams of example lighting fixtures according to various embodiments, as will be best understood in conjunction with the light source spectra shown in FIGS. 3A, 3B. FIG. 2A is a block diagram of an example lighting fixture 200 (e.g., one of the lighting fixtures 120-126 shown in FIG. 1, or any other light source in the space, for example, a floor or table lamp, a smart light bulb, etc.) that may include a controllable-CR-value load control 210. The controllable-CR-value load control 210 of the lighting fixture 200 may include a multi-channel driver 220 and a cumulative lighting load 230. The cumulative lighting load 230 may include a plurality of light sources (e.g., LED light sources).

The controllable-CR load control 210 shown in FIG. 2A may be configured to control the intensity of one or more of the individual elements (i.e., light sources) of the cumulative lighting load 230, in order to adjust the cumulative light emitted by the cumulative lighting load and thus the lighting fixture 200. For example, the lighting fixture 200, may produce a cumulative light output at a specific CCT, intensity, and CR, each of which may be adjusted independently of each other. The cumulative CR (i.e., circadian response output) of the lighting fixture 200, may correspond to the relative spectral power distribution of a range of wavelengths in the blue region of the wavelength spectra created by mixing the light output by the individual light sources of the cumulative lighting load. For example, according to metrics of CS and EML, the blue wavelengths corresponding to peak sensitivity of melatonin suppression may be within the range of approximately 440-490 nanometers, and more broadly, the action spectra may correspond to approximately 425 to approximately 525 nanometers, as will be referred to in the remainder of this disclosure.

The cumulative light output of the lighting fixture 200, may have an adjustable CR output based on the fixture capability. For example, the cumulative light output may be adjusted from a low CR value (i.e., may produce cumulative light output having substantially no light output with spectral power distribution in the blue wavelength region and therefore no likely melatonin suppression of an occupant in the space) to a high CR value (i.e., the cumulative light output has a strong spectral power distribution within the blue wavelength region and therefore will likely suppress the production of melatonin of an occupant in the space), as defined by the capability of the individual light sources. The CR of the cumulative light output may be adjusted by adjusting the relative intensities of the individual light sources to mix their light output.

The cumulative lighting load 230 may include a first light source 232 and a second light source 234. The first and second light sources 232, 234 may be discrete-spectrum light sources, continuous-spectrum light sources, and/or hybrid light sources. For example, the first and second light sources 232, 234 may emit substantially the same color temperature, but the first light source may have a high circadian response (CR) and the second light source may have a low circadian response (CR). The controllable-CR load control 210 may be configured to control the intensities of the first and second light sources 232, 234 in order to achieve a desired intensity and/or CR of the light emitted by the cumulative lighting load 230.

It should be noted that any reference herein regarding light sources having "substantially the same" color temperature indicates that the difference in color temperature between the light sources is sufficiently minimal so as to not be readily apparent or discernible by the human eye, that is, such that changes in the relative intensities of the light sources do not result in visible changes in color temperature of the cumulative light output of the fixture. More specifically, the light sources may have chromaticities within a one-step MacAdam ellipse of each other within the u'v' color space.

In order to control the light emitted by the cumulative lighting load 230, the multi-channel LED driver 220 of the controllable-CR load control 210 may include a first load regulation circuit 222, a second load regulation circuit 224, and a control circuit 225. The control circuit 225 may be configured to generate a first drive signal $V_{DR1}$ to control the first load regulation circuit 222 in order to adjust the intensity of the first light source 232. The control circuit 225 may be configured to generate a second drive signal $V_{DR2}$ to control the second load regulation circuit 224 in order to adjust the intensity of the second light source 234. The drive signals $V_{DR1}$, $V_{DR2}$ may be analog signals and/or digital signals. The load regulation circuits may adjust the intensities of the respective light sources using a current control or a voltage control technique, for example.

The control circuit 225 may be coupled to a memory 229 for storing the fixture capability information of the lighting fixture 200, for example. In addition, the memory 229 may store instructions that are executed by the control circuit 225 to provide the functions and features described herein.

The control circuit 225 may be configured to control (e.g., individually control) the amount of power delivered to the first and second light sources 232, 234 to thus control the intensities of the light sources. The control circuit 225 may be configured to control the first load regulation circuit 222 to conduct a first load current (or voltage) through the first light source 232, and to control the second load regulation circuit 224 to conduct a second LED current (or voltage) through the second light source 234. For example, the light sources 232, 234 may be substantially the same color LED light sources with different spectra, for example as shown in FIG. 3A or 3B, and the light emitted by the light sources may be mixed together to adjust the CR of the cumulative light emitted by the lighting fixture 200. The CR of the lighting fixture may be based on the relative intensities of the first light source and the second light source to create a range of different CR values (e.g., from 0 to 1) of the cumulative light output of the lighting fixture based on the fixture capability. For example, the first light source 232 may be configured to have a first color temperature output and a light spectra corresponding to a CR "boost". For example, the first light source 232 may a peak in the blue area of the spectrum (i.e., having a measurable spectral power distribution within the range of 425 to 525 nanometers, and thus have a CR boost). The second light source 234 may have a second color temperature output, and may alternatively be configured to have a non-CR boost, for example, by having a peak in a purple portion of the spectrum, but not the blue portion (i.e., having a primary emission peak of less than 425 nanometers, with substantially lower (or no) spectral power distribution within the range of 425 to 525 nanometers, having a low, or "non-boosted", CR). The first color temperature and the second color temperature may be substantially the same color temperature, such that changing the relative intensities between the two light sources 232, 234 may change the CR of the light output of the fixture, but may not change the cumulative color temperature output of the lighting fixture 200. The control circuit 225 may be configured to adjust the intensities the first light source 232 and the second light source 234 to control the CR of the cumulative light emitted by the lighting fixture 200.

FIGS. 3A, 3B depict example spectral power distributions 300, 350 of power vs. wavelength for two different light sources (represented by the solid and dashed lines, respectively), each light source having substantially the same color temperature but different CR. For example, the solid-line spectra may represent spectral power distributions for light sources having a low ("non-boosted") CR, while the dashed-line spectra represent spectral power distributions for light sources having a high ("boosted") CR.

FIG. 3A shows two light sources each having substantially the same warm color temperature, for example, a color temperature within the range of about 2000K to 3000K. The example spectra shown are typical for white LEDs manufactured from a blue or purple LED die with a phosphor coating. For example, both the solid-line and dashed-line spectrums may have similar power output (i.e., from the phosphor emission) in the wavelength range of 600-650 nanometers, as shown at points 304, 314. However, the local maxima at peaks 302 and 312 (i.e., the emission output of the blue or purple LED) are distinctly shifted apart from each other. The solid-line spectrum has a local maximum around 400 nanometers at point 302, which is in the purple range of the spectrum. This peak at point 302 is characteristic of, and may be achieved by, a purple LED with phosphor coating. Because the solid-line spectrum has very little output between 425-525 nanometers, (i.e., the blue portion of the wavelength spectrum, noted herein as the Circadian Response (CR) region) the solid-line spectrum may have a low CR due to the spectral content of the light source. In contrast, the dashed-line spectrum represents the spectral power distribution of a warm color temperature light source having a CR boost. For example, the dashed-line spectrum has a local maximum shown at point 312 around 450 nanometers, (i.e., the CR boost spectrum has a much higher luminance output in the blue range of the wavelength spectrum as compared with the non-CR boost solid-line spectrum). This peak at point 312 is characteristic of, and may be achieved by, for example, a blue LED with a phosphor coating. The phosphor coating of the respective LEDs may be different phosphor coatings, or may be the same phosphor coatings.

Similarly, the graph 350 of FIG. 3B depicts two light sources each having a substantially same warm cool temperature, for example, a color temperature within the range of about 4000K to 10,000K. As described for FIG. 3A, the example spectra shown are typical for white LEDs manufactured from an LED die with a phosphor coating. Similar to FIG. 3A, the local maxima at peaks 352 and 362 are distinctly shifted apart from each other. The solid-line spectrum has a local maximum around 400 nanometers at point 352 (again, in the purple area of the spectrum). Because the solid-line spectrum has very little output between 425-525 nanometers, (i.e., the blue portion of the wavelength spectrum) the solid-line spectrum may have a low CR due to the spectral content of the light source. Again, this may be achieved by a purple LED with phosphor coating. The purple LED may be the same primary emission purple LED as shown in FIG. 3A (with a different phosphor coating to create an overall cool color temperature), or may be a different purple LED having a slightly different peak emission wavelength. In contrast, the dashed-line spectrum represents substantially the same cool color temperature light source, with a CR boost (as compared with the solid-line spectrum). For example, the dashed-line spectrum has a local maximum shown at point 362 around 450 nanometers, (i.e., has a much higher luminance output in the blue portion of the wavelength spectrum as compared with the non-CR boost solid-line spectrum). Again, this peak at point 362 may be achieved, for example, by a blue LED with a phosphor coating. The blue LED shown in FIG. 3B may be the same primary emission blue LED as shown in FIG. 3A (with a different phosphor coating to create an overall cool color temperature), or may be a different blue LED having a slightly different peak emission wavelength.

One will understand that the disclosure is not limited to the spectra provided in FIGS. 3A, 3B, which are presented herein as representative examples only, and that other light source spectra which achieve similar CR-boost and non CR-boost output as the same color temperature and are also contemplated. For example, LEDs having a peak emission frequency different than what is depicted here may be used (for example, 380 nanometers as opposed to 400 nanometers), in addition to phosphors with different spectra than what it depicted in the figures herein, or alternatively using discrete-source LEDs (such as red, green, and/or blue instead of a single LED with phosphor coating, etc.).

The light sources 232, 234 shown in FIG. 2A may exhibit the power vs. wavelength spectra (that, is the spectral power distributions) as shown in FIG. 3A or FIG. 3B (or other representative spectra). For example, the fixture of FIG. 2A may be a warm light output with light sources 232, 234 as in FIG. 3A. Or, the fixture of FIG. 2A may be a cool light output with light sources 232, 234 as in FIG. 3B. By including two light sources 232, 234 with the same color temperature but different spectra (CR boost vs. non-CR boost), the CR of the cumulative light emitted by the lighting fixture 200 may be adjustable. The control circuit 225 may be configured to adjust the CR of the cumulative light output of the lighting fixture 200 to adjust the relative intensities (i.e., the mixing) of the CR boost first light source 232 and the non-CR boost of the second light source 234. That is, the control circuit 225 may control the magnitudes of the load currents (i.e., to control the intensities) conducted through the first and second light sources 232, 234 to mix the light output of the CR boost first light source 232 and the light output of the non-CR boost second light source 234, respectively, to control the CR of the cumulative light emitted by the lighting fixture 200 to the desired CR value. For example, the cumulative light output of the fixture may be adjusted from a CR value of 0 (corresponding to the CR boost first light source 232 having an intensity of 0% and the non-CR boost second light source 234 having an intensity of 100%), to a CR value of 1 (corresponding to the CR boost first light source 232 having an intensity of 100% and the non-CR boost second light source 234 having an intensity of 0%), or any CR value in between 0 and 1 corresponding to a mixing of light output of the first and second light sources 232, 234 to create the CR of the cumulative light output of the lighting fixture. That is, one will understand that the CR value of the cumulative light output (e.g., 0 to 1) is a relative number which defines the mixture of light output of the independent light sources (i.e., the relative intensities of the first and second light sources), as will be defined in greater detail herein. Further, one will recognize that the actual value of CR may be scaled, adjusted, or otherwise re-interpreted to represent the mixing of spectra by adjusting the intensities of the CR boost and non-CR boost light sources of the fixture. For example, other numbers and ranges such as 0 to 100, etc., may alternatively be defined and used in a similar manner, and are considered within the scope of this disclosure.

The multi-channel driver 220 may comprise a communication circuit 228 adapted to be coupled to a communication link (e.g., a digital communication link), such that the control circuit 225 may be able to transmit and/or receive messages (e.g., digital messages) via the communication link. The multi-channel driver 220 may be assigned a unique identifier (e.g., a link address) for communication on the communication link. The multi-channel driver 220 may be configured to communicate with a system controller (e.g., the system controller 110), as well as other LED drivers and control devices, via the communication link. The control circuit 225 may be configured to receive messages including commands to control the composite lighting load 230 via the communication circuit 228. For example, the communication link may comprise a wired communication link, for example, a digital communication link operating in accordance with one or more predefined communication protocols (such as, for example, one of Ethernet, IP, XML, Web Services, QS, DMX, BACnet, Modbus, LonWorks, and KNX protocols), a serial digital communication link, an RS-485 communication link, an RS-232 communication link, a digital addressable lighting interface (DALI) communication link, or a LUTRON ECOSYSTEM communication link. Additionally, or alternatively, the digital communication link may comprise a wireless communication link, for example, a radio-frequency (RF), infrared (IR), or optical communication link. Messages may be transmitted on an RF communication link using, for example, one or more of a plurality protocols, such as the LUTRON CLEARCONNECT, WIFI, ZIGBEE, Z-WAVE, THREAD, KNX-RF, and ENOCEAN RADIO protocols.

The control circuit 225 may be responsive to messages (e.g., digital messages that include the respective link address of the driver) transmitted by the system controller to the multi-channel driver 220 via the communication link. The control circuit 225 may be configured to control the light sources 232, 234 in response to the messages received via the communication link. The system controller may be configured to transmit messages to the multi-channel driver 220 for turning both light sources 232, 234 on and off (e.g., to turn the lighting fixture 200 on and off). The system controller may also be configured to transmit messages to the multi-channel driver 220 for adjusting at least one of the intensity and the CR of the cumulative light emitted by the lighting fixture 200. The multi-channel driver 220 may be configured to transmit messages including feedback information via the digital communication link.

The system controller may be configured to transmit a command (e.g., control instructions) to the multi-channel driver 220 for adjusting the intensity and/or the CR value of the cumulative light emitted by the lighting fixture 200 (e.g., the light emitted by the first and second light sources 232, 234). For example, the command may include a desired intensity (e.g., a requested intensity) and/or a desired CR (e.g., a requested CR) for the cumulative light emitted by the lighting fixture 200. The control circuit 225 may adjust the magnitudes of the load currents conducted through the first and second light sources 232, 234 to control the cumulative light emitted by the lighting fixture 200 to the desired CR value of the command. In an example, the intensity levels of both the first and second light sources 232, 234 may be controlled in order to affect the overall CR (and thereby the MSS value) of the light emitted by the composite lighting load 230.

FIG. 2B is a block diagram of an example lighting fixture 240 according to another embodiment (e.g., one of the lighting fixtures 120-126 shown in FIG. 1) that may include a controllable-color-temperature load control 242. The lighting fixture 240 shown in FIG. 2B may emit a cumulative light output having independently adjustable intensity, color temperature, and CR. The controllable-color-temperature load control 242 of the lighting fixture 240 may include a multi-channel driver 244 and a composite lighting load 245. For example, the composite lighting load 245 may include a first light source 246, a second light source 247, a third light source 248, and a fourth light source 249. The light sources 246-249 may be discrete-spectrum light sources, continuous-spectrum light sources, and/or hybrid light sources. The controllable-color-temperature load control 242 may be configured to control light sources 246-249 in order to achieve a desired intensity, color temperature, and/or circadian response (CR) value of the cumulative light emitted by the composite lighting load 245.

In order to control the color temperature of the cumulative light emitted by the composite lighting load 244, the multi-channel driver 244 of the controllable-color-temperature load control 242 may include a first load regulation circuit 252, a second load regulation circuit 254, a third load regulation circuit 256, a fourth load regulation circuit 258, and a control circuit 255. The control circuit 255 may be configured to generate a first, second, third, and fourth drive signals $V_{DR1}$, $V_{DR2}$, $V_{DR3}$, $V_{DR4}$ to control each of the respective load regulation circuits 252, 254, 256, 258 in order to adjust the intensity of the respective light source 246, 247, 248, 249. The control signals may be analog signals and/or digital signals. In an example, the control circuit 255 may be configured to control the intensities of the light sources 246, 247, 248, 249 in order to adjust the overall color temperature and/or CR of the light emitted by the composite lighting load 244. The control circuit 255 may be coupled to a memory 259 for storing the fixture capability information and/or room capability information of the lighting fixture 240. In addition, the memory 259 may store instructions that are executed by the control circuit 255 to provide the functions described herein.

The control circuit 255 may be configured to control (e.g., individually control) the amount of power delivered to the first, second, third, and fourth light sources 246, 247, 248, 249 to thus control the intensities of the light sources. The control circuit 255 may be configured to control the first, second, third, and fourth load regulation circuits 252, 254, 256, 258 to conduct respective load currents through the respective light sources 246, 247, 248, 249. For example, the light sources 246, 247, 248, 249 may be different color and/or CR-boost or non-CR boost LED light sources, and the light emitted by the light sources may be mixed together to adjust the color temperature and/or CR of the cumulative light emitted by the lighting fixture 240. The control circuit 255 may be configured to adjust the intensities of the light sources 246, 247, 248, 248 to control the color and/or CR of the cumulative light emitted by the lighting fixture 240 within a color gamut of the lighting fixture. For example, the control circuit 255 may be configured to mix the light emitted by the light sources 246, 247, 248, 249 to adjust the color temperature of the light emitted by the composite lighting load 244 along a black body radiator curve.

For example, the first light source 246 may be a warm non-CR boost light source, having a spectrum similar to the solid line spectrum shown in FIG. 3A, and the second light source 247 may be a warm CR boost light source, having a spectrum similar to the dashed line spectrum shown in FIG. 3A. Additionally, the third light source 248 may be a cool non-CR boost light source, having a spectrum similar to the solid line spectrum shown in FIG. 3B, and the fourth light source 249 may be a cool CR boost light source, having a spectrum similar to the dashed line spectrum shown in FIG. 3B. One will understand the spectrum shown in FIGS. 3A, 3B, are representative examples only, and that other spectra achieving the same function may be used.

The multi-channel driver 244 may comprise a communication circuit 253 adapted to be coupled to a communication link (e.g., a digital communication link), such that the control circuit 255 may be able to transmit and/or receive messages (e.g., digital messages) via the communication link. The multi-channel driver 244 may be assigned a unique identifier (e.g., a link address) for communication on the communication link. The multi-channel driver 244 may be configured to communicate with a system controller (e.g., the system controller 110), as well as other drivers and control devices, via the communication link. The control circuit 255 may be configured to receive messages including commands to control the composite lighting load 245 via the communication circuit 253. For example, the communication link may comprise a wired communication link, for example, a digital communication link operating in accordance with one or more predefined communication protocols (such as, for example, one of Ethernet, IP, XML, Web Services, QS, DMX, BACnet, Modbus, LonWorks, and KNX protocols), a serial digital communication link, an RS-485 communication link, an RS-232 communication link, a digital addressable lighting interface (DALI) communication link, or a LUTRON ECOSYSTEM communication link. Additionally, or alternatively, the digital communication link may comprise a wireless communication link, for example, a radio-frequency (RF), infrared (IR), or optical communication link. Messages may be transmitted on an RF communication link using, for example, one or more of a plurality protocols, such as CLEARCONNECT, BLUETOOTH, WIFI, ZIGBEE, Z-WAVE, THREAD, KNX-RF, and ENOCEAN RADIO protocols.

The control circuit 255 may be responsive to messages (e.g., digital messages that include the respective link address of the driver) transmitted by the system controller to the multi-channel driver 244 via the communication link. The control circuit 255 may be configured to control the light sources 246, 247, 248, and 249 in response to the messages received via the communication link. The system controller may be configured to transmit messages to the multi-channel driver 244 for turning light sources 246, 247, 248, and 249 both on and off (e.g., to turn the lighting fixture 240 on and off). The system controller may also be configured to transmit a command to the multi-channel driver 244 for adjusting at least one of the intensity, CR, and the color (e.g., the color temperature) of the cumulative light emitted by the lighting fixture 240. For example, the command may include a desired intensity (e.g., a requested intensity), a desired CR (e.g., a requested CR value), and/or a desired color temperature (e.g., a requested color temperature) for the cumulative light emitted by the lighting fixture 240. The control circuit 255 may adjust the magnitudes of the load currents conducted through the first, second, third, and fourth light sources 246, 247, 248, 249 to control the cumulative light emitted by the lighting fixture 240 to the desired color temperature of the command. The multi-channel driver 244 may be configured to transmit messages including feedback information via the digital communication link.

One will understand that the examples described herein are for descriptive purposes only, and that the embodiments are not limited to the specific examples shown here. Further, although the warm and cool CR boost and non-CR boost light source spectra shown in FIGS. 3A, 3B, have been described as LEDs with phosphor coating, one skilled in the art will understand that the phosphor coating for the CR boost and non-CR boost light sources may not be the same phosphor. Additionally, one will recognize that the embodiments are not limited to LEDs with phosphor coating, but in fact, any light sources, or group of light sources, capable of producing the same color temperature value with different CR values, are considered within the scope of this disclosure.

Further, the load controls 210, 242 may each be implemented in a single device or multiple devices. For example, the control circuit 225 of the multi-channel driver 220 may be comprised of two (or more) individual control circuits for controlling the individual light sources of the cumulative lighting load 230. The individual control circuits may be in operative communication with each other and may be located in the same or different devices. For example, the individual control circuits may each be configured to control an individual load regulation circuits (e.g., one of the load regulation circuits 222, 224). Examples of lighting fixtures having a multi-channel driver for load control systems are described in greater detail in U.S. Patent Application Publication No. 2016/0183344, published Jun. 23, 2016, entitled MULTI-CHANNEL LIGHTING FIXTURE HAVING MULTIPLE LIGHT-EMITTING DIODE DRIVERS. One will recognize that other example multi-channel drivers may be used with the systems described herein. In addition, one will recognize that multi-channel drivers may include additional light sources (i.e., more than two or three as described herein).

Figure 4:
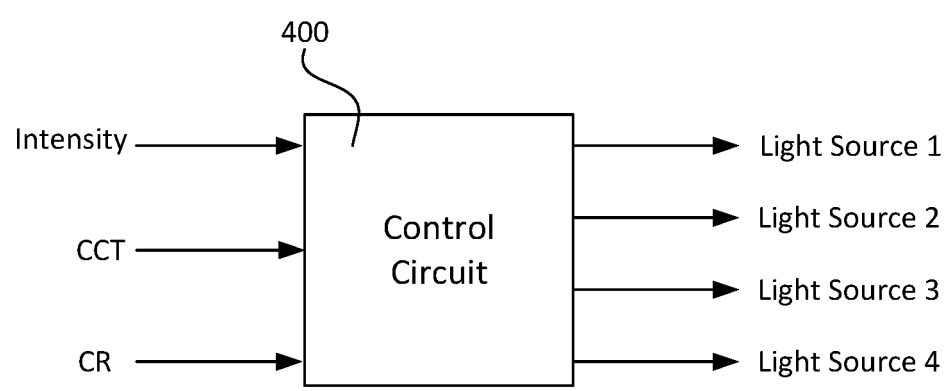
FIG. 4 shows a diagram of example inputs and outputs of a control circuit.

The system 100 may provide inputs of desired intensity and CR to the controllable load 200 to control the intensity and CR within the room or building. The system 100 may provide inputs of intensity, color temperature, and CR to the controllable load 240 to control the intensity, color temperature, and CR within the room or building. For example, FIG. 4 shows an example control circuit 400 configured to receive inputs of intensity, controllable color temperature (CCT), and CR. Based on the inputs of intensity, CCT, and CR, the control circuit 400 is configured to change the outputs (i.e., control the intensity, CCT, and CR) of a first, second, third, and fourth light source. For example, the control circuit 400 may be similar to the control circuit 255 of FIG. 2B, and the light sources 1-4 of FIG. 4 may correspond to light sources 246-249 of FIG. 2B.

The cumulative intensity, CCT, and CR of the light output of the lighting fixture (for example, the lighting fixture 240 of FIG. 2B) may be based on the mixture of intensities of each light source in the fixture. For example, the cumulative intensity (INT) of the fixture may be calculated according to the following formula:

$$INT = C_B + W_B + C_N + W_N \quad [1]$$

where $C_B$ is the intensity of the cool CR boost light source, $W_B$ is the intensity of the warm CR boost light source, $C_N$ is the intensity of the cool non-CR boost light source, and $W_N$ is the intensity of the warm non-CR boost light source. More generally, for a light fixture having n light sources, each light source having an intensity int, the cumulative intensity may generally be calculated as:

$$INT = \sum_{i=1}^{n} int_i \quad [2]$$

Further, the CR value, CR, may be estimated by summing the intensity of the CR boost light sources divided by the cumulative intensity of the light fixture. The system 100 may estimate the amount of MSS a person is subjected to, based on the CR of the light output in the space. For example, the CR value, represented by CR, may be a function of the intensity output by the light source and their individual spectra. In the case of the light source of FIG. 2B, for example, the following equation may apply:

$$CR = \frac{C_B + W_B}{C_B + W_B + C_N + W_N} \quad [3]$$

For more complex systems including additional light sources, the following general equation may be used, where CR is equal to the sum of the intensities of the CR boost sources ($int_{boost}$) divided by the total intensity:

$$CR = \frac{\sum int_{boost}}{INT} \quad [4]$$

The cumulative CCT of the fixture may be calculated based on the difference between the maximum CCT (that is, the light source having the highest color temperature value, $CCT_{max}$) and the minimum CCT (that is, the light source having the lowest color temperature value, $CCT_{min}$), multiplied by the percentage of cool intensity over the total (i.e., cumulative) intensity, plus the minimum CCT:

$$CCT = (CCT_{max} - CCT_{min})\frac{C_B + C_N}{C_B + W_B + C_N + W_N} + CCT_{min} \quad [5]$$

To solve for the intensities of each individual light source ($C_B$, $W_B$, $C_N$, $W_N$), equations [1], [3] and [5] may be used along with equation [6] below, added to constrain variables:

$$CR = \frac{C_B}{C_B + C_N} = \frac{W_B}{W_B + W_N} \quad (W_N \text{ and } C_N) > 0 \quad [6]$$

Equation [6], which constrains the intensity of the CR boosted cool light source $C_B$ as a percentage of the total cool intensity to be equal to the intensity of the CR boosted warm light source $W_B$ as a percentage of the total warm intensity. From this constraint equation, the intensity values for each of the four light sources can be readily calculated as a function of the inputs CR, INT, and CCT. The equations [1], [3], [5], and [6] are solved here for $W_B$, as shown below in equation [7]. The remaining intensities $W_N$, $C_B$, and $C_N$ are written as functions of each other and $W_B$, respectively, for simplicity, according to equations [8]-[10]:

$$W_B = \left[1 - \frac{CCT - CCT_{min}}{CCT_{max} - CCT_{min}}\right] * INT * CR \quad [7]$$

$$W_N = \frac{W_B - CR * W_B}{CR} \quad [8]$$

$$C_B = CR * INT - W_B \quad [9]$$

$$C_N = INT - C_B - W_B - W_N \quad [10]$$

Accordingly, for any input values of CR, intensity, and CCT, (i.e., as received by the system controller or another control-source device) based on the $CCT_{min}$ and $CCT_{max}$ of the fixture 200, the respective output values of intensity for each fixture can easily be determined, such that each fixture can meet the requirements of CR, intensity, and CCT. One will understand that equations [1] through [10] may also be used with the fixture of FIG. 2A, having only two light sources. For example, for a warm CR boost first light source 232 and a warm non-CR boost second light source 234, the values of $C_B$ and $C_N$ may be set to zero (and CCT may no longer apply). In a second example, for a cool CR boost first light source 232 and a cool non-CR boost second light source 234, the values of $W_B$ and $W_N$ may be set to zero (and CCT may no longer apply).

The system controller 110 may receive commands from a control-source device, for example, the mobile device 160, wearable wireless device 170, or remote control 140. The system controller 110 may then process the command to determine which lighting fixture(s) (i.e., 120-126) to send the command to. The lighting fixture(s) may receive the command from the system controller and then determine how to adjust the intensities for each light source (shown in FIG. 4). based on the equations previously described.

For example, the lighting fixture 240 of FIG. 2B may receive, via the communication circuit 253, a command to adjust CR of the cumulative light output, and based on the command, may determine a respective output of the first light source and the second light source to achieve the CR. For example, the respective output may be a light intensity, or a another measurement that correlates with light output. For example, the respective output may be a current or a voltage which the respective load regulation devices provide to the respective light sources. The control circuit 253 of the lighting fixture 240 may generate respective drive signals $V_{DR1}$, $V_{DR2}$, $V_{DR3}$, $V_{DR4}$ to control the load regulation circuits 252-258 in order to adjust the intensities of the first, second, third, and fourth light sources to produce the adjusted CR of the cumulative light output according to the received command.

The CR, intensity, and correlated color temperature (CCT) of the cumulative light output may be adjusted independently. For example, the lighting fixture may adjust the CR of the cumulative light output while maintaining the color temperature and intensity, or may adjust the color temperature of the cumulative light output while maintaining the CR and intensity, etc.

Figure 5:
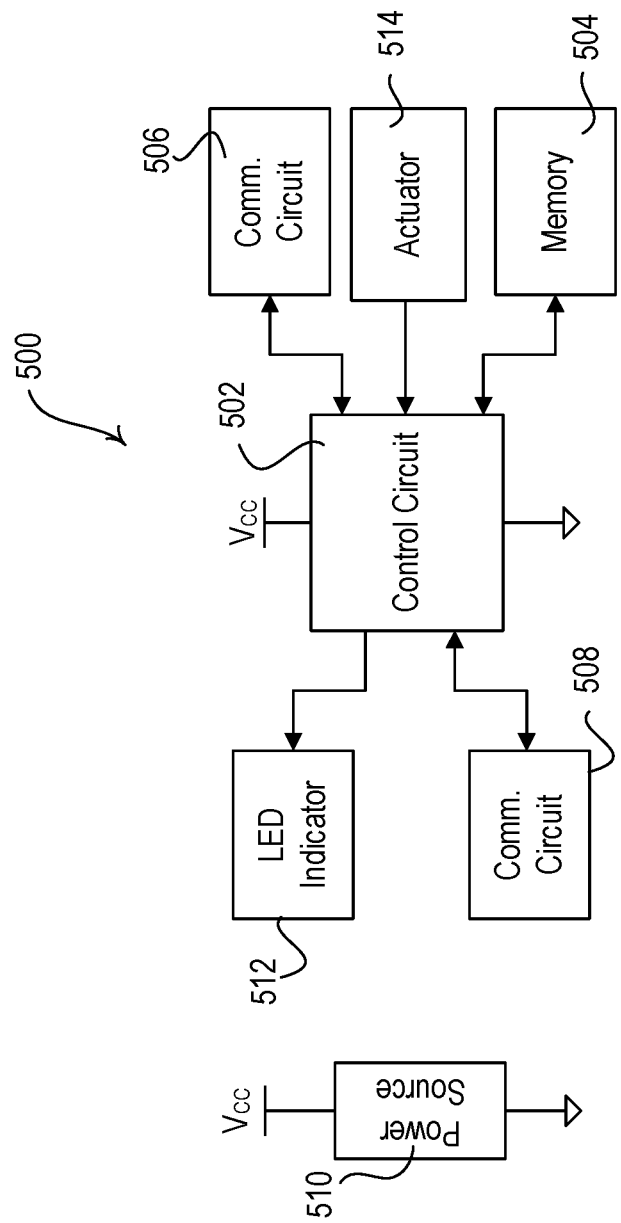
FIG. 5 depicts a block diagram of an example system controller.

FIG. 5 is a block diagram illustrating an example system controller 500 (corresponding to system controller 110 of FIG. 1). The system controller 500 may include a control circuit 502 for controlling the functionality of the system controller 500. The control circuit 502 may include one or more general purpose processors, special purpose processors, conventional processors, digital signal processors (DSPs), microprocessors, integrated circuits, a programmable logic device (PLD), application specific integrated circuits (ASICs), or the like. The control circuit 502 may perform signal coding, data processing, power control, input/output processing, or any other functionality that enables the system controller 500 to perform as described herein. The control circuit 502 may store information in and/or retrieve information from the memory 504. The memory 504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 500 may include a communications circuit 506 for transmitting and/or receiving information. The communications circuit 506 may perform wireless and/or wired communications. The system controller 500 may also, or alternatively, include a communications circuit 508 for transmitting and/or receiving information. The communications circuit 506 may perform wireless and/or wired communications. The communications circuits 506 and 508 may be in communication with control circuit 502. The communications circuits 506 and 508 may include RF transceivers or other communications modules capable of transmitting and/or receiving wireless communications via one or more antennas. The communications circuit 506 and communications circuit 508 may be capable of transmitting and/or receiving communications via the same communication channels or different communication channels. For example, the communications circuit 506 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 508 may be capable of communicating (e.g., with control devices and/or other devices in the load control system) via another wireless communication channel (e.g., WI-FI® or a proprietary communication channel, such as CLEAR CONNECT™).

The control circuit 502 may be coupled to an LED indicator 512 for providing indications to a user. The control circuit 502 may be coupled to an actuator 514 (e.g., one or more buttons) that may be actuated by a user to communicate user selections to the control circuit 502. For example, the actuator 514 may be actuated to put the control circuit 502 in an association mode and/or communicate association messages from the system controller 500.

Each of the modules within the system controller 500 may be powered by a power source 510. The power source 510 may include an alternating-current (AC) power supply or a direct-current (DC) power supply. For example, the power source 510 may be any one of: a line voltage AC power source, a battery, Power over Ethernet, Universal Serial Bus, or the like. The power source 510 may generate a supply voltage $V_{CC}$ for powering the modules within the system controller 500.

In addition to controlling fixtures and room capabilities for a single room as described herein, the system controller 500 may additionally control fixtures in multiple rooms. The fixtures controlled by the system controller 500 may not be limited to ceiling-mounted fixtures but additionally may include: wall sconces, lamps, task lighting, mood lighting, decorative lighting, emergency lighting, and the like.

Although the light sources have been described herein as part of a lighting fixture, one will understand that the light sources are not limited to sharing the same lighting fixture, but may be in separate lighting fixtures. For example, although a first light source may be included in a different lighting fixture than a second light source, the two light sources may be located sufficiently close together from the perspective of an observer that their cumulative emissions appear to be from a single light source. The relative proximity of two or more light sources that emit cumulative or combined light emissions may vary depending on the position or distance of a desired target or observer of the cumulative light emissions. For example, the two or more light sources may be located relatively close together (e.g., in the same fixture) if the target or observer of the cumulative light is relatively close to the light sources (e.g., in the same room). If the target or observer is farther away, the two or more light sources may be separated by a relatively greater distance.

What is claimed:

1. A lighting fixture configured to produce a cumulative light output comprising a color temperature, an intensity, and a circadian response, the lighting fixture comprising:
   a first set of light sources including a first light source configured to emit light having a first color temperature and a second light source configured to emit light having a second color temperature;
      wherein the first and second color temperatures comprise a substantially same warm color temperature in the range of 1800K-3000K; and
      wherein the light emitted by the first light source is configured to produce a higher spectral power distribution over a range of wavelengths in a first region of the visible light spectrum than that of the second light source over the range of wavelengths in the first region of the visible light spectrum;
   a second set of light sources including s a third light source configured to emit light having a third color temperature and a fourth light source configured to emit light having a fourth color temperature;
      wherein the third and fourth color temperatures comprise a substantially cool color temperature in the range of 3500K-8000K; and
      wherein the third light source is configured to produce a higher spectral power distribution over the range of wavelengths in the first region of the visible light spectrum than that of the fourth light source over the range of wavelengths in the first region of the visible light spectrum;
   a communication circuit configured to receive commands; and
   a control circuit coupled to the communication circuit, the control circuit configured to:
      receive, via the communication circuit, a command to adjust the circadian response of the cumulative light output, wherein the circadian response comprises a value that indicates a sum of respective intensities of the first and third light sources with respect to a sum of respective intensities of the first, second, third, and fourth light sources representing the cumulative light output of the lighting fixture;
      based on the command, determine a respective intensity of the first light source, the second light source, the third light source, and the fourth light source; and
      control the first, second, third, and fourth light sources to the determined respective intensities to produce the adjusted circadian response of the cumulative light output.

2. The lighting fixture of claim 1, wherein the first region of the visible light spectrum comprises a blue region of the visible light spectrum.

3. The lighting fixture of claim 2, wherein the range of wavelengths is approximately 425 nanometers to 525 nanometers.

4. The lighting fixture of claim 1, wherein the first light source comprises a blue light emitting diode (LED and the second light source comprises a purple LED.

5. The lighting fixture of claim 4, wherein the blue LED has a primary emission peak between approximately 425 nanometers to 525 nanometers, further wherein the purple LED has a primary emission peak less than 425 nanometers.

6. The lighting fixture of claim 4, wherein the blue LED has a primary emission peak between approximately 440 nanometers to 490 nanometers, further wherein the purple LED has a primary emission peak less than 425 nanometers.

7. The lighting fixture of claim 1, wherein the third light source comprises a blue light emitting diode (LED and the fourth light source comprises a purple LED.

8. The lighting fixture of claim 7, wherein the blue LED has a primary emission peak between approximately 425 nanometers to 525 nanometers, further wherein the purple LED has a primary emission peak less than 425 nanometers.

9. The lighting fixture of claim 8, wherein the blue LED has a primary emission peak between approximately 440 nanometers to 490 nanometers, further wherein the purple LED has a primary emission peak less than 425 nanometers.

10. The lighting fixture of claim 1, wherein the first color temperature and the second color temperature have corresponding chromaticities within a one-step MacAdam ellipse of each other.

11. The lighting fixture of claim 10, wherein the second third color temperature and the fourth color temperature have corresponding chromaticities within a one-step MacAdam ellipse of each other.

12. The lighting fixture of claim 1, wherein the control circuit is further configured to maintain the intensity and the color temperature of the cumulative light output when the circadian response is adjusted in response to the received command.

13. The lighting fixture of claim 1, wherein the control circuit is further configured to:
   receive a second command comprising an intensity, a correlated color temperature (CCT), and a circadian response;
   determine intensities of the first, second, third, and fourth light sources based on the received intensity, CCT, and circadian response of the second command, wherein the determined intensity of the first light source as a percentage of the first and second light sources is equal to the determined intensity of the third light source as a percentage of the third and fourth light sources; and
   control the intensities of the first, second, third, and fourth light sources to produce the intensity, CCT, and circadian response of the cumulative light output according to the received second command.

14. A system for controlling a cumulative light output, the system comprising:
   a first set of light sources including a first light emitting diode (LED) having a primary emission peak between a range of 425 nanometers to 525 nanometers and configured to emit light having a first color temperature and a second LED having a primary emission peak less than 425 nanometers and configured to emit lighting having a second color temperature;
      wherein the first and second color temperatures comprise a first substantially same color temperature in the range of 1800K-3000K; and
      wherein the light emitted by the first LED is configured to produce a higher spectral power distribution over the range of 425 nanometers to 525 nanometers than that of the second LED over the range of 425 nanometers to 525 nanometers; and
   a second set of light sources including a third LED having a primary emission peak between the range of 425 nanometers to 525 nanometers and configured to emit light having a third color temperature and a fourth LED having a primary emission peak less than 425 nanometers and configured to emit light having a fourth color temperature;

wherein the third and fourth color temperatures comprise a second substantially same color temperature in the range of 3500K-8000K; and wherein the light emitted by the third LED is configured to produce a higher spectral power distribution over the range of 425 nanometers to 525 nanometers than that of the fourth LED over the range of 425 nanometers to 525 nanometers.

15. The system of claim 14, wherein the first, second, third, and fourth LEDS are housed within a lighting fixture.

16. The system of claim 15, wherein the first color temperature and the second color temperature have corresponding chromaticities within a one-step MacAdam ellipse of each other; and wherein the third color temperature and the fourth color temperature have corresponding chromaticities within a one-step MacAdam ellipse of each other.

17. The system of claim 16, further comprising:

an input device; and a system controller comprising a communication circuit for transmitting and receiving commands, wherein the system controller is configured to:

receive, via the communication circuit, a command from the input device to adjust a circadian response, wherein the circadian response comprises a value that indicates a sum of respective intensities of the first and third LEDs with respect to a sum of respective intensities of the first, second, third, and fourth LEDs representing the cumulative light output of the lighting fixture; and based on the received command, transmit, via the communication circuit, a second command to adjust the circadian response to the lighting fixture.

18. The system of claim 17, wherein the lighting fixture further comprises:

a communication circuit configured to receive commands from the system controller; and a control circuit coupled to the communication circuit of the lighting fixture and operably coupled to the first, second, third, and fourth LEDs, wherein the control circuit is configured to:

receive, via the communication circuit of the lighting fixture, the second command to adjust the circadian response of the cumulative light output of the lighting fixture;

based on the received second command, determine a respective intensity of the first, second, third, and fourth LEDs; and control the first, second, third and fourth LEDs to the determined respective intensities to produce the adjusted circadian response of the cumulative light output of the lighting fixture.

* * * * *